United States Patent [19]

Bedis et al.

[11] 4,351,573
[45] Sep. 28, 1982

[54] SPLIT MASTER LINK FOR TRACK OF TRACK-LAYING TRACTORS

[75] Inventors: Michael Bedis; Donald E. Westemeier, both of Dubuque, Iowa

[73] Assignee: Deere & Company, Moline, Ill.

[21] Appl. No.: 219,625

[22] Filed: Dec. 24, 1980

[51] Int. Cl.³ .................. B62D 55/20; B62D 55/28
[52] U.S. Cl. ....................................... 305/54; 305/39
[58] Field of Search ............... 305/39, 58 R, 58 PC, 305/54, 59

[56] References Cited

U.S. PATENT DOCUMENTS

| | | | |
|---|---|---|---|
| 3,096,661 | 7/1963 | Reinsma et al. | 305/58 PC |
| 3,427,079 | 2/1969 | Skromme et al. | 305/58 |
| 3,822,923 | 7/1974 | Stedman | 305/58 R |
| 4,050,750 | 9/1977 | Yoshihashi et al. | 305/54 |

Primary Examiner—Charles A. Marmor

[57] ABSTRACT

A split master link includes first and second separable sections which are joined together at an overlapping joint comprising a series of interengaged teeth located centrally in the link mass. The link sections have confronting surfaces forming continuations of the opposite ends of the tooth racks of the sections and in one embodiment, one of each set of confronting surfaces at an end of the tooth racks is stepped so that a relief area extends from the tooth rack towards a side of the link through a distance of approximately three-fourths of the disance of the tooth to the side of the link. In a second embodiment, the pair of confronting surfaces at each end of the tooth racks are arranged in converging relationship so that they converge at a side of the track link. A relief area is thus formed at the opposite ends of the tooth racks and each relief area extends to an adjacent side of the link. Relief areas of both the embodiments serve to greatly decrease the cyclic strain that the track link would experience for a given load as compared to a track link having no such relief areas.

8 Claims, 3 Drawing Figures

SPLIT MASTER LINK FOR TRACK OF TRACK-LAYING TRACTORS

BACKGROUND OF THE INVENTION

The present invention relates to a split master link that is particularly adapted for use with the endless track chain of a crawler-tractor-type vehicle.

It is necessary to have some means of separating the track chain on a track-type crawler vehicle. If the track chain joints are sealed and lubricated, separation is accomplished by a split master link so that the integrity of the seal remains intact during separation. However, the most common split master link designs all include separate first and second link sections including respective central tooth rack or serrated surface portions which are interengaged with each other and located between respective flat bearing surface portions with the flat bearing surface portions of the first link section abutting the flat bearing surface portions of the second link section. Bolts or cap screws are provided for clamping the link section together and such clamping acts to prestress or preload critical areas, with respect to the fatigue life of the sections, located at the transitions between the tooth racks and flat surface areas thereof. High cyclic strains occur at these critical areas during normal operation of these prior art master link designs and consequently, these designs have a relatively low fatigue life.

A current split master link which is on the market and typifies the prior art is disclosed in U.S. Pat. No. 3,427,079 issued to Skromme et al on Feb. 11, 1969.

SUMMARY OF THE INVENTION

According to the present invention, there is provided an improved split master link. Specifically, the split master link of the present invention includes a pair of link sections mating at central tooth rack or serrated surface portions thereof and including clamping or bearing surface areas spaced to opposite sides of the tooth rack portions.

An object of the invention is to provide a split master link having increased fatigue life.

A more specific object of the invention is to provide a split master link wherein the link sections have a mating surface arranged such that the clamping area or the bearing area is forced to occur on that portion of the mating surfaces which is furthest from an interengaged tooth rack forming part of the mating surface and located centrally within the track link.

These and other objects will become apparent from a reading of the ensuing description together with the appended drawings.

DESCRIPTION OF THE PREFERRED EMBODIMENT

Figure 1:
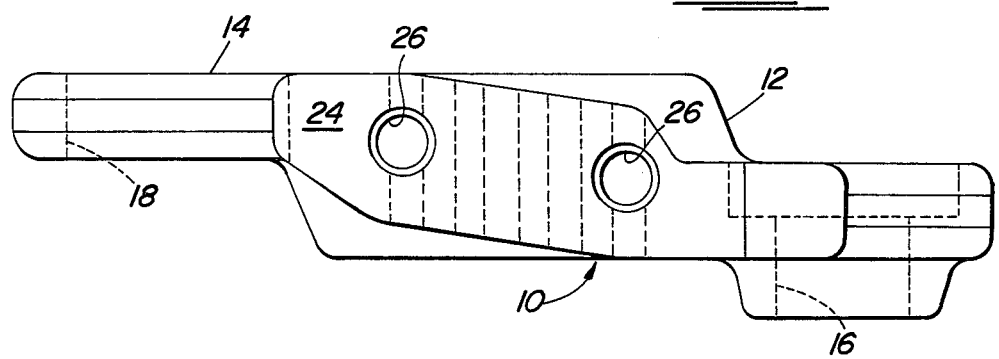
FIG. 1 is a top plan view of the track master link as it would appear at the top run of a track-laying tractor track.
Figure 2:
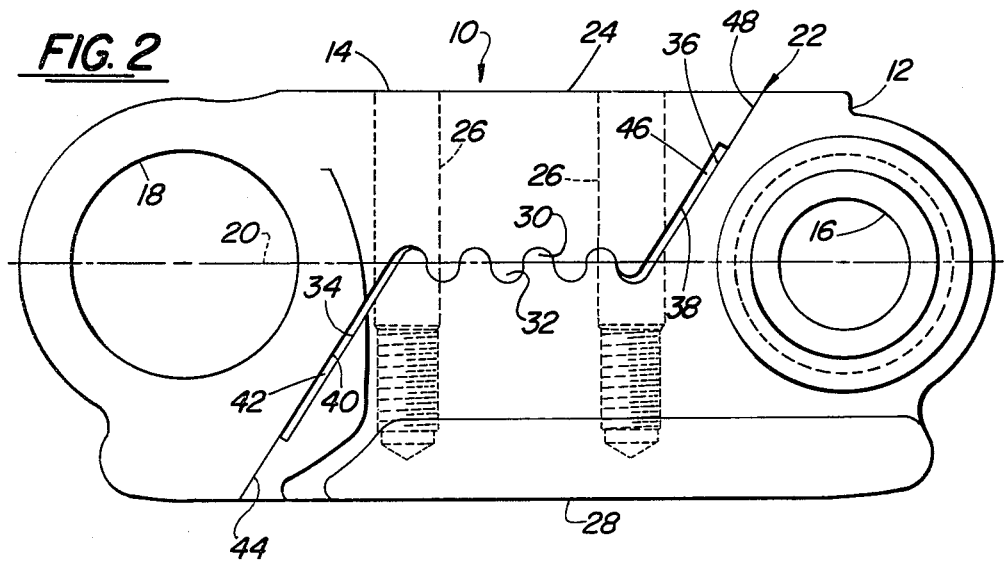
FIG. 2 is a side view of the link shown in FIG. 1.

Referring now to FIGS. 1 and 2, therein is shown a track link 10 comprising first and second sections 12 and 14, respectively. Provided in the opposite ends of the link 10 so as to be in the first and second sections 12 and 14, respectively, are a pin bore 16 and a bushing bore 18.

A line connecting the centers of the bores 16 and 18 is here shown at 20 (FIG. 2). The first and second link sections 12 and 14 have overlapping portions located between the bores 16 and 18 and joined together along a separable joint indicated at 22. The link 10 includes an outer side 24 adapted for having a track shoe bolted thereto by cap screws or bolts which extend through the track shoe and into connecting bores 26 which extend downwardly into the link so as to pass through the link section 14 and terminate in the link section 12. The track link 10 includes an opposite inner side 28 which forms part of a rail portion adapted for engagement with track roller supports as the track chain, in which it is embodied, revolves.

The separable joint 22 is made up of confronting surfaces formed on the track link sections 12 and 14. Specifically, the first link section 12 includes a tooth rack or serrated surface portion 30 located on the line of centers 20 approximately half way between the centers of the bores 16 and 18. Interengaged with the tooth rack 30 is a tooth rack 32 formed on the second link section 14. The tooth racks 30 and 32 extend over approximately the central one-third of the distance between the centers of the bores 16 and 18. As viewed in FIG. 1, a stepped inner surface 34 forms a leftward continuation of the tooth rack 30 while a planar outer surface 36 forms a rightward continuation of the tooth rack 30. Similarly, a stepped outer surface 38 forms a rightward continuation of the tooth rack 32 while a planar inner surface 40 forms a leftward continuation of the tooth rack 32. The stepped inner surface 34 and the planar inner surface 40 are disposed in confronting relationship to each other so as to define an inner space or relief area 42 which extends from the tooth racks 30 and 32 towards the inner side 28 of the link over a distance equal to approximately three-fourths of the length of the planar surface 40. The stepped inner surface 34 abuts against the remaining quarter of the length of the planar inner surface 40 and cooperates to define an inner bearing area 44. Similarly, the outer planar surface 36 is disposed in confronting relationship with the stepped outer surface 38 so as to form a relief or space 46 and an outer bearing area 48.

When cap screws are installed in the bores 26 of the link sections 12 and 14, the bearing areas 44 and 48 are clamped together so as to preload or prestress the critical areas at the transition between the tooth rack 30 and surface 36, and between the tooth rack 32 and surface 40. Because of the distance between the areas 44 and 48 and the respective critical areas, the amount of prestress at the critical areas is about four times that which would be experienced at the critical areas of a comparably clamped pair of link sections of the prior art type having bearing areas beginning at the opposite ends of the interengaged tooth racks. It has been found that with this higher preload, the range of cyclic strain experienced at the critical areas for a given working load may be reduced by as much as one-fourth of the cyclic strain range experienced by the prior art link sections.

Thus, it will be appreciated that the relief areas 42 and 46 reduce cyclic loading at the critical stress area occurring at the transition between the tooth racks 30 and 32 and the continuing surfaces of the separable joint 22.

Figure 3:
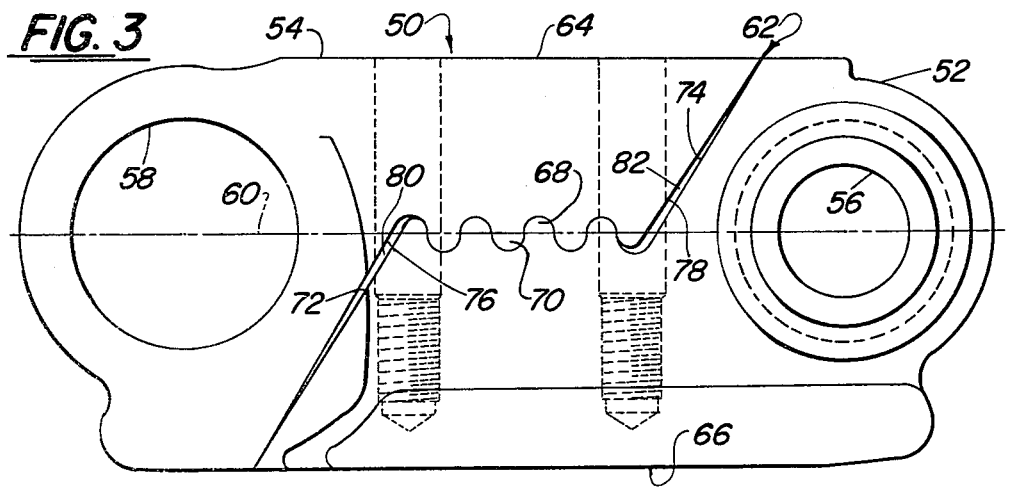
FIG. 3 is a side view, similar to FIG. 1, but showing an alternate form of the split master link.

Referring now to FIG. 3, therein is shown an alternate embodiment of the invention. Thus, appearing in FIG. 3 is a track line 50 including first and second sections 52 and 54, respectively, and in which are located a pin bore 56 and a bushing bore 58. The bores 56 and 58 have their centers connected by a line indicated at 60. Like the track link 10 discussed above, the first and second sections 52 and 54 of the track link 50 include overlapping sections which form a separable joint 62. The track link 50 includes an outer side 64 adapted for receiving a track shoe and has an opposite inner side 66.

The separable joint 62 includes interengaged tooth racks 68 and 70, respectively, of the track sections 52 and 54. The tooth racks are centrally located between the bores 56 and 58 on the line of center 60. As viewed in the drawing, planar inner and outer surfaces 72 and 74, respectively, form continuations of the left-hand and right-hand ends of the tooth rack 68 of the link section 52 while planar inner and outer surfaces 76 and 78 respectively form left- and right-hand extensions of the tooth rack 70 of the link section 54. The inner surfaces 72 and 76 are sloped differently so as to converge towards each other and to come into engagement with each other at the inner side 66 of the link 50. Similarly, the outer surfaces 74 and 78 are sloped to converge into engagement with each other at the outer side 64 of the link 50. An inner space 80 is thus defined between the inner planar surfaces 72 and 76 while an outer space 82 is defined between the outer planar surfaces 74 and 78. The spaces 80 and 82 serve exactly the same function as do the spaces 42 and 46 of the previously described track link 10.

We claim:

1. In an endless track split master link including an outer side adapted for receiving a track shoe and an opposite inner side, first and second separable link sections respectively having parallel pin and bushing bores extending therethrough, the first and second link sections having respective overlapped portions located between the pin and bushing bores and including respective inner and outer confronting surface portions forming continuations of respective intermediate interengaged serrated surface portions, the improvement comprising: said inner and outer confronting surface portions being inclined relative to a line of centers passing through said pin and bushing bores and spaced apart from each other in respective zones extending from the intermediate interengaged serrated surface portions towards the inner and outer sides of the link; and said inner and outer confronting surface portions being engaged with each other respectively inwardly and outwardly of said respective zones.

2. The split master link defined in claim 1 wherein the respective inner and outer confronting surface portions of the first and second separable link sections are spaced apart over approximately three-fourths of the respective distances from the intermediate interengaged serrated surface portions to the inner and outer sides of the link.

3. The split master link defined in claim 1 wherein the respective inner and outer confronting surfaces converge towards each other and meet each other at the inner and outer sides of the link.

4. The split master link defined in claim 2 wherein the inner and outer surface portions respectively of the the first and second link sections are remote from the bores of the first and second link sections and are stepped so as to parallel the inner and outer surface portions of the second and first link sections, respectively, over three-fourths of their length from the intermediate serrated surface portions to the inner and outer sides of the link.

5. A split master link comprising: a link having first and second connecting bores respectively located in opposite ends thereof and having an outer side adapted for receiving a track shoe and an opposite inner side; said link including first and second separate sections having overlapping portions located between the bores; said overlapping portions respectively including tooth racks located centrally between the bores and intermeshed with each other; each link section having inner and outer surface portions joined to opposite ends of and forming continuations of the tooth racks and respectively extending to the inner and outer sides of the link; and the inner and outer surface portions of the first and second link section being engaged with each other only at respective bearing areas spaced outwardly and inwardly from the tooth racks.

6. The split master link defined in claim 5 wherein the inner surface of the first link section and the outer surface of the second link section are planar and wherein the inner surface of the second link section and the outer surface of the first link section are stepped so as to respectively engage the inner and outer surfaces of the first and second link sections, respectively, at locations spaced from the interengaged tooth racks.

7. The split master link defined in claim 6 wherein the inner and outer surfaces respectively of the second and first link sections are stepped such that they are respectively spaced from the inner and outer surface portions of the first and second link sections for a distance of approximately three-fourths of the total length of the last mentioned inner and outer sections from the interengaged tooth racks to the inner and outer side of the link.

8. The split master link defined in claim 5 wherein the inner surfaces of the first and second link sections are planar and converge into engagement with each other at the inner side of the link while the outer surfaces of the first and second link sections converge into engagement with each other at the outer side of the link.

* * * * *